June 12, 1923.

M. S. CLAWSON

WELDING APPARATUS

Filed April 23, 1920

Witness:
John M. Jester

Inventor
Monroe S. Clawson
By H. A. Gowrick
Attorney

Patented June 12, 1923.

1,458,273

UNITED STATES PATENT OFFICE.

MONROE S. CLAWSON, OF UPPER MONTCLAIR, NEW JERSEY.

WELDING APPARATUS.

Application filed April 23, 1920. Serial No. 376,068.

*To all whom it may concern:*

Be it known that I, MONROE S. CLAWSON, a citizen of the United States, residing at Upper Montclair, in the county of Essex and State of New Jersey, have invented new and useful Improvements in Welding Apparatus, of which the following is a specification.

This invention relates to the metal working art, particularly to the welding of metals, and has for its object the provision of a welding apparatus particularly designed to be used in connection with a portion of the apparatus disclosed in my Patent No. 1,306,948, granted June 17, 1919, my device being intended for use in welding pieces of metal by means of an electric current, the essential feature being the provision of resistance members interposed between the contacts to which a source of current is connected and the pieces of metal to be welded whereby the passage of the current through the resistance members will generate heat which will be conducted to and which will result in welding the pieces of metal, it being of course understood that the usual strip of welding material be interposed between the pieces to be united.

An important object is the provision of a device of this character which may be formed as an attachment to the structure shown in the above mentioned patent and to take the place of the so called boat or crucible used therein.

An additional object is the provision of a device of this character which will be simple and inexpensive in manufacture, highly efficient in use, durable in service, and a general improvement in the art.

Figure 1:
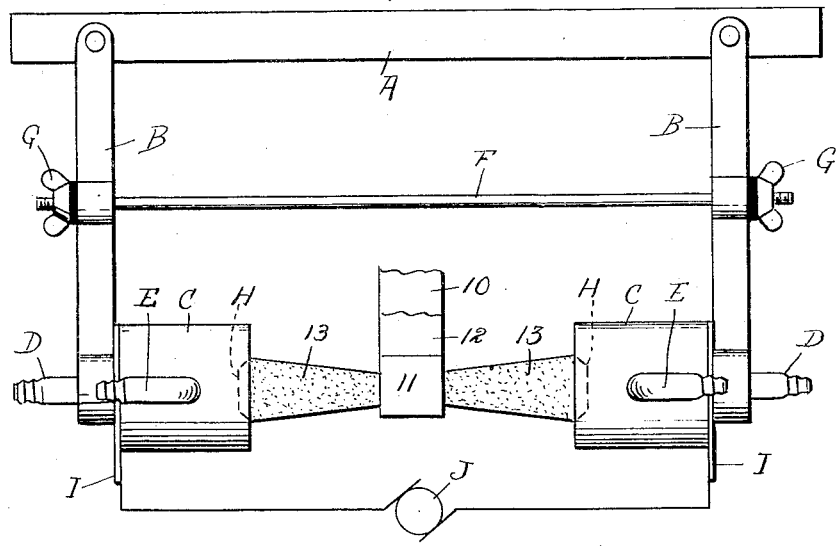
Figure 2:
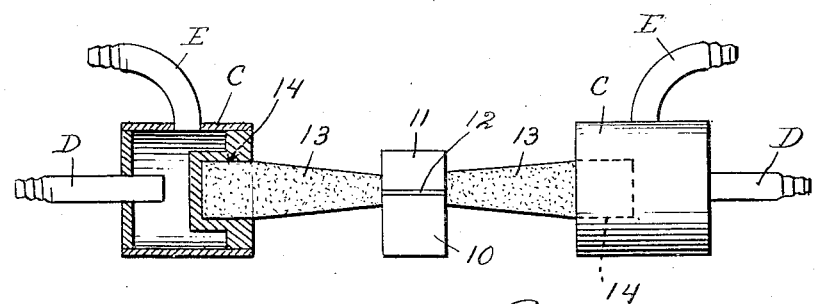
Figure 3:
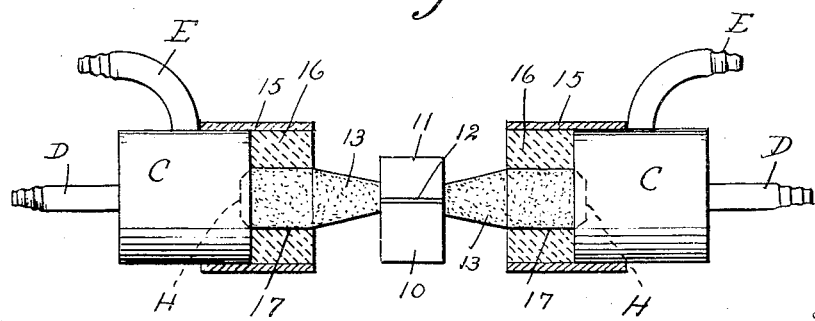

With the above and other objects and advantages in view, the invention consists in the details of construction to be hereinafter more fully described and claimed, and illustrated in the accompanying drawings in which Figure 1 is a plan view of the device showing it in use for welding purposes, Figure 2 is a front elevation of a portion thereof showing one form of the device, and Figure 3 is a view partly in section and partly in front elevation showing my device formed as an attachment.

Referring more particularly to the drawings, the letter A designates a supporting bar having pivoted thereon arms B carrying hollow water-cooled heads C provided with inlet and outlet pipes D and E for the passage of water. The arms B are adapted to be drawn together by a rod F carrying clamping nuts G. The confronting faces of the heads are formed with recesses H.

In carrying out the present invention I dispose the pieces of metal 10 and 11 to be welded, between the heads C with a strip 12 of welding material such as a suitable alloy, between the pieces. I then interpose resistance members 13 between the assembled pieces and the heads, with the butt ends of the members engaged within the recesses H. The nuts G are then tightened to cause the arms B to urge the heads into clamping engagement with the resistance members and the latter into engagement with the pieces to be welded. The resistance members are formed preferably of carbon or graphite though it is conceivable that some other material might be employed.

The heads C carry contacts I connected with any suitable source of current indicated conventionally at J. When current is passed through the device it is apparent that its passage through the resistance members 13 will cause heat to be generated and this heat will of course be conducted to the pieces 10 and 11 to be welded. It is also apparent that when, as shown, the pieces 10 and 11 are horizontally disposed, the welding material 12 disposed between them will not run out by gravity.

Referring more specifically to Figure 2, it will be observed that there is a slight modification in the apparatus. In this form the only difference is that the recesses 14 in the water-cooled heads C are of greater depth so as to form more efficient retaining means for holding the resistance members 13 in position.

Referring more particularly to Figure 3, it will be seen that I have formed an attachment designed to be used in connection with the apparatus shown in my prior patent above referred to and shown partially in Figure 1 of the drawings of the present invention. In this form I make no alterations whatever in the construction of the water-cooled heads C but use in connection therewith collars 15 formed of cylindrical shells of suitable material engageable exteriorly upon the heads C and having disposed therein cores 16 of refractory material which might be fire-brick, clay, porcelain, or other material, and these collars 15 have formed therein openings 17 registering with the recesses H in the heads C. The resistance members 13 are, in this instance, disposed within the central openings 17 in the refractory material 16 with their butt ends engaged within the recesses H and with their other ends engaged against the pieces of material 10 and 11 at the joint therebetween. The operation is of course the same in all forms of the device, the passage of the current through the resistance members producing the heat which, being transmitted or conducted to the pieces of material and the welding material disposed therebetween, results in uniting the pieces.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A welding apparatus comprising a pair of heads connected with a source of current, a member of refractory material associated with each head and having an enclosing metallic shell detachably engaged upon the head, and each refractory member being formed to receive one end of a resistance element.

2. A welding apparatus comprising a pair of heads connected with a source of current, a collar surrounding each head, a core of refractory material within each collar and having a central opening, and resistance members disposed within said openings and engaging against opposite sides of pieces of metal to be welded.

In testimony whereof I hereto affix my signature.

MONROE S. CLAWSON.